US008580884B2

(12) United States Patent
Ding

(10) Patent No.: US 8,580,884 B2
(45) Date of Patent: Nov. 12, 2013

(54) THERMOPLASTIC POLYURETHANE BLOCK COPOLYMER COMPOSITIONS

(75) Inventor: Ruidong Ding, Shanghai (CN)

(73) Assignee: Kraton Polymers U.S. LLC, Houston, TX (US)

( * ) Notice: Subject to any disclaimer, the term of this patent is extended or adjusted under 35 U.S.C. 154(b) by 344 days.

(21) Appl. No.: 12/944,220

(22) Filed: Nov. 11, 2010

(65) Prior Publication Data

US 2011/0112236 A1    May 12, 2011

Related U.S. Application Data

(60) Provisional application No. 61/260,698, filed on Nov. 12, 2009.

(51) Int. Cl.
*C08L 53/00*    (2006.01)

(52) U.S. Cl.
USPC .............. 524/505; 525/88; 525/89; 525/92 C; 525/98; 525/940

(58) Field of Classification Search
USPC ....... 524/505, 572; 525/88, 89, 92 C, 98, 940
See application file for complete search history.

(56) References Cited

U.S. PATENT DOCUMENTS

| | | | |
|---|---|---|---|
| 2,929,800 A | 3/1960 | Hill | |
| 2,948,691 A | 8/1960 | Windemerth et al. | |
| 3,272,890 A | 9/1966 | O'Leary | |
| 3,310,604 A | 3/1967 | Steingiser et al. | |
| 3,351,676 A | 11/1967 | Sanders et al. | |
| 3,358,052 A | 12/1967 | Archer, Jr. et al. | |
| 3,384,653 A | 5/1968 | Erner et al. | |
| 3,394,164 A | 7/1968 | McClellan et al. | |
| 3,493,634 A | 2/1970 | Kolycheck | |
| RE27,145 E | 6/1971 | Jones | |
| 3,620,905 A | 11/1971 | Stover et al. | |
| 3,642,964 A | 2/1972 | Rausch, Jr. et al. | |
| 3,644,457 A | 2/1972 | Konig et al. | |
| 3,883,571 A | 5/1975 | Allport et al. | |
| 3,929,923 A | 12/1975 | Hosler et al. | |
| 3,963,679 A | 6/1976 | Ullrich et al. | |
| 3,985,830 A | 10/1976 | Fetters et al. | |
| 4,031,026 A | 6/1977 | Ibbotson | |
| 4,039,593 A | 8/1977 | Kamienski et al. | |
| 4,057,595 A | 11/1977 | Raumer | |
| 4,088,627 A | 5/1978 | Gergen et al. | |
| 4,115,429 A | 9/1978 | Reiff et al. | |
| 4,118,411 A | 10/1978 | Reiff et al. | |
| 4,131,604 A | 12/1978 | Szycher | |
| 4,169,196 A | 9/1979 | Ehrlich et al. | |
| 4,245,081 A | 1/1981 | Quiring et al. | |
| 4,299,347 A | 11/1981 | Rougier | |
| 4,371,684 A | 2/1983 | Quiring et al. | |
| 4,379,904 A | 4/1983 | Ehrlich et al. | |
| 4,391,949 A | 7/1983 | St. Clair | |
| 4,410,595 A | 10/1983 | Matsumoto et al. | |
| 4,423,185 A | 12/1983 | Matsumoto et al. | |
| 4,444,953 A | 4/1984 | St Clair | |
| 4,447,590 A | 5/1984 | Szycher | |
| RE31,671 E | 9/1984 | Bonk et al. | |
| 4,523,005 A | 6/1985 | Szycher | |
| 4,621,113 A | 11/1986 | Collins | |
| 4,631,329 A | 12/1986 | Gornowicz | |
| 4,788,361 A | 11/1988 | Olson et al. | |
| 4,868,243 A | 9/1989 | Gelles et al. | |
| 4,868,245 A | 9/1989 | Pottick et al. | |
| 4,883,837 A | 11/1989 | Zabrocki | |
| 5,623,019 A * | 4/1997 | Wiggins et al. | ............. 525/92 C |
| 6,492,469 B2 | 12/2002 | Willis et al. | |
| 6,534,594 B1 | 3/2003 | Kimura et al. | |
| 7,030,189 B2 | 4/2006 | Masubuchi | |
| 2003/0181585 A1 | 9/2003 | Handlin et al. | |
| 2003/0216507 A1* | 11/2003 | Masubuchi | ...................... 525/66 |
| 2004/0171766 A1* | 9/2004 | Agrawal | ....................... 525/452 |
| 2005/0137346 A1 | 6/2005 | Bening et al. | |
| 2008/0015306 A1* | 1/2008 | Wright et al. | .................. 524/572 |

FOREIGN PATENT DOCUMENTS

| | | |
|---|---|---|
| CA | 716645 | 8/1965 |
| WO | 2008045702 A2 | 4/2008 |

OTHER PUBLICATIONS

Britain, J. W. and Gemeinhardt, P.G., "Catalysis of the Isocyanate-Hydroxyl Reaction", Journal of Applied Polymer Science, vol. IV, Issue No. 11, pp. 207-211 (1960).
Saunders et al., Polyurethanes, Chemistry and Technology, Part I, Interscience, New York, 1963, pp. 228-232.

* cited by examiner

*Primary Examiner* — Kelechi Egwim
(74) *Attorney, Agent, or Firm* — Clements Bernard; Michael A. Masse

(57) ABSTRACT

A novel block copolymer composition including a hydrogenated block copolymer that has at least one block A and at least one block B, and wherein (a) prior to hydrogenation each A block is a mono alkenyl arene homopolymer block and each B block is a controlled distribution copolymer block of at least one conjugated diene and at least one mono alkenyl arene, (b) subsequent to hydrogenation about 0-10% of the arene double bonds have been reduced, and at least about 90% of the conjugated diene double bonds have been reduced, (c) each A block having a number average molecular weight between about 3,000 and about 60,000 and each B block having a number average molecular weight between about 30,000 and about 300,000, (d) each B block comprises terminal regions adjacent to the A blocks that are rich in conjugated diene units and one or more regions not adjacent to the A blocks that are rich in mono alkenyl arene units, (e) the total amount of mono alkenyl arene in the hydrogenated block copolymer is about 5 percent weight to about 50 percent weight, and (f) the weight percent of mono alkenyl arene in each B block is between about 10 percent and about 75 percent. The thermoplastic polyurethane elastomer is present in the block copolymer in an amount from about 50 to about 95 percent by weight of a thermoplastic polyurethane elastomer.

20 Claims, No Drawings

THERMOPLASTIC POLYURETHANE BLOCK COPOLYMER COMPOSITIONS

CROSS-REFERENCE TO RELATED APPLICATIONS

The present application claims the benefit of U.S. provisional patent application Ser. No. 61/260,698, filed Nov. 12, 2009, entitled Thermoplastic Polyurethane Block Copolymer Compositions.

BACKGROUND OF THE INVENTION

1. Field of the Invention

The present invention relates generally to novel compositions comprising (a) controlled distribution block copolymers of mono alkenyl arenes and conjugated dienes having the general formula A-EB/A-A and (A-EB/A)nX, and (b) thermoplastic polyurethane elastomers that result in surprising improvements in properties for the composition.

2. Background of the Prior Art

Thermoplastic urethane ("TPU") elastomers are an important class of materials in the rapidly growing field of thermoplastic elastomers. TPUs are generally made from long chain diols, chain extenders and polyisocyanates. The properties are achieved by phase separation of soft and hard segments. The hard segment, formed by, for example, adding butanediol to the diisocyanate, provides mechanical strength and high temperature performance. The soft segment, consisting of long flexible polyether or polyester chains with molecular weight of 600 to 4000, controls low temperature properties, solvent resistance and weather resistance.

Urethane based thermoplastic elastomers have an impressive range of performance characteristics such as outstanding scratch/abrasion resistance, excellent oil resistance and high tensile/tear strength. TPU can be processed by injection molding, blown film, extrusion, blow molding and calendaring. It is used in a broad range of applications such as films and sheets, athletic equipment, hoses/tubing, medical devices and automotive molded parts. However, application of TPU is limited when low hardness (<70 A) is required, such as applications when soft touch is required. It is difficult to produce soft grade TPU materials without adding plasticizers, which are not desirable in some applications.

Others have proposed various blends of TPU with other polymers. U.S. Pat. No. 3,272,890 discloses blends of 15 to 25 weight percent of polyurethane in polyethylene. This is achieved by first melting and fluxing the polyethylene in a Banbury mixer to which is added the polyurethane. In a series of U.S. Pat. Nos. 3,310,604; 3,351,676; and 3,358,052, there is disclosed polyurethanes having dispersed therein 0.2 to 5 weight percent polyethylene. U.S. Pat. No. 3,929,928 teaches that blends of 80:20 to 20:80 weight ratio of chlorinated polyethylenes with polyurethanes and containing 1 to 10 pph of polyethylene result in improved processability, particularly in the manufacture of films or sheets by milling or calendering. Such blends are more economical than the polyurethane alone.

U.S. Pat. Nos. 4,410,595 and 4,423,185 disclose soft resinous compositions containing 5 to 70 weight percent thermoplastic polyurethanes and 30 to 95 percent of polyolefins modified with functional groups such as carboxyl, carboxylic acid anhydride, carboxylate salt, hydroxyl, and epoxy. One of the features of the disclosed blends is their adhesion to other polymeric substances such as polyvinyl chloride, acrylic resins, polystyrenes, polyacrylonitriles, and the like. This property leads to their prime utility in the coextrusion, extrusion coating, extrusion laminating, and the like of polymer laminates. U.S. Pat. No. 4,883,837 discloses thermoplastic compatible compositions comprising (A) a polyolefin, (B) a thermoplastic polyurethane, and a compatibilizing amount of (C) at least one modified polyolefin. U.S. Pat. No. 4,088,627 discloses multicomponent blends of thermoplastic polyurethane, a selectively hydrogenated styrene/diene block copolymer and at least one dissimilar engineering thermoplastic. U.S. Pat. No. 7,030,189 discloses blends of a thermoplastic polyurethane, a polar group-containing thermoplastic elastomer and another thermoplastic elastomer.

However, none of these blend compositions results in the desired soft touch, along with excellent clarity. What is needed is a compound containing TPU that has the proper hardness and the desired clarity.

BRIEF SUMMARY OF THE INVENTION

The particular compositions of the present invention are blends of a thermoplastic polyurethane elastomer and a controlled distribution block copolymer. It has been shown that S-EB-S and (S-EB/S)nX block copolymers are very effective for hardness modification of TPUs. It has been surprisingly found that blends of the TPU S-EB-S and (S-EB/S)nX block copolymers also result in excellent optical clarity. Clarity was not expected as the solubility parameters of the two materials are different. TPU is a polar material, and S-EB-S and (S-EB/S)nX are non-polar. Typical blends of such materials are cloudy due to the basic incompatibility of polar and non-polar materials.

According to one embodiment of the present invention a novel block copolymer composition includes a hydrogenated block copolymer that has at least one block A and at least one block B, and wherein:

a. prior to hydrogenation each A block is a mono alkenyl arene homopolymer block and each B block is a controlled distribution copolymer block of at least one conjugated diene and at least one mono alkenyl arene;

b. subsequent to hydrogenation about 0-10% of the arene double bonds have been reduced, and at least about 90% of the conjugated diene double bonds have been reduced;

c. each A block having a number average molecular weight between about 3,000 and about 60,000 and each B block having a number average molecular weight between about 30,000 and about 300,000;

d. each B block comprises terminal regions adjacent to the A blocks that are rich in conjugated diene units and one or more regions not adjacent to the A blocks that are rich in mono alkenyl arene units;

e. the total amount of mono alkenyl arene in the hydrogenated block copolymer is about 5 percent weight to about 80 percent weight; and f. the weight percent of mono alkenyl arene in each B block is between about 10 percent and about 75 percent; and g. about 50 to about 95 percent by weight of a thermoplastic polyurethane elastomer.

According to another embodiment of the present invention, a novel block copolymer composition includes between about 0.1% to about 5% of a maleated controlled distribution block copolymer.

According to another embodiment of the present invention, a novel block copolymer composition wherein the mono alkenyl arene is styrene.

According to yet another embodiment of the present invention, a novel block copolymer composition wherein the conjugated diene is selected from the group consisting of butadiene and isoprene.

According to yet another embodiment of the present invention, a novel block copolymer composition that includes oil in an amount between about 10 wt % to about 20 wt %, including all points in-between.

According to yet another embodiment of the present invention, a novel block copolymer composition that includes a B block that comprises from about 1 wt % to about 20 wt % of a functionalized conjugated diene, including all points in-between.

According to yet another embodiment of the present invention, a novel block copolymer composition that includes a block copolymer that contains about 10 to about 30 percent by weight styrene, including all points in-between.

According to yet another embodiment of the present invention, a novel block copolymer composition wherein the TPU is derived from the reaction of an organic diisocyanate, at least one polymeric diol, and at least one difunctional extender.

According to yet another embodiment of the present invention, a novel block copolymer composition that includes about 5 wt % to about 10 wt % of a functionalized polymer, including all points in-between.

According to yet another embodiment of the present invention, a novel block copolymer composition that includes a TPU that is derived from 4,4'-methylenebis(cyclohexyl isocyanate), a 2,000 molecular weight polyethyleneoxy capped polypropyleneoxy diol, and 1,4-butanediol.

According to yet another embodiment of the present invention, a novel block copolymer composition that includes a TPU that is derived from 4,4'-methylenebis(phenyl isocyanate), a blend of a 2,000 and 700 molecular weight polybutylene adipate diol, and 1,4-butanediol.

According to yet another embodiment of the present invention, a novel block copolymer composition that includes a TPU that is a polyether based polyurethane.

According to yet another embodiment of the present invention, a novel block copolymer composition that has a polyurethane from about 20 to about 80 percent by weight.

According to yet another embodiment of the present invention, a novel block copolymer that includes a hydrogenated block copolymer that has at least one block A and at least one block B, and wherein:

(a) a. prior to hydrogenation each A block is a mono alkenyl arene homopolymer block and each B block is a controlled distribution copolymer block of at least one conjugated diene and at least one mono alkenyl arene;
  b. subsequent to hydrogenation about 0-10% of the arene double bonds have been reduced, and at least about 90% of the conjugated diene double bonds have been reduced;
  c. each A block having a number average molecular weight between about 3,000 and about 60,000 and each B block having a number average molecular weight between about 30,000 and about 300,000;
  d. each B block comprises terminal regions adjacent to the A blocks that are rich in conjugated diene units and one or more regions not adjacent to the A blocks that are rich in mono alkenyl arene units;
  e. the total amount of mono alkenyl arene in the hydrogenated block copolymer is about 5 percent weight to about 50 percent weight;
  f. the weight percent of mono alkenyl arene in each B block is between about 10 percent and about 75 percent;

(b) from about 10 wt % to about 20 wt % of oil; and
(c) about 50 to about 95 percent by weight of a thermoplastic polyurethane elastomer.

According to yet another embodiment of the present invention, a novel block copolymer that includes between about 0.1% to about 5% of a maleated controlled distribution block copolymer.

According to yet another embodiment of the present invention, a novel block copolymer that includes a Shore A hardness that is between about 70 to about 60 according to ASTM D2240.

According to yet another embodiment of the present invention, a novel block copolymer that includes a light transmittance between about 80% to about 90%, including all points in-between.

According to yet another embodiment of the present invention, a novel block copolymer that includes a block copolymer and TPU have a similar refractive indexes.

DETAILED DESCRIPTION OF THE INVENTION

The non-hydrogenated block copolymers are well known and are described and claimed in a number of US patents, and are commercially available from KRATON Polymers. Regarding the particular parameters of the non-hydrogenated block copolymer used in the present invention, the block copolymer chosen has the general configuration A-B/A-A or (A-B/A)nX, where n is an integer from 2 to about 30, and X is coupling agent residue and wherein:

(a) a. prior to hydrogenation each A block is a mono alkenyl arene homopolymer block and each B block is a controlled distribution copolymer block of at least one conjugated diene and at least one mono alkenyl arene;
  b. subsequent to hydrogenation about 0-10% of the arene double bonds have been reduced, and at least about 90% of the conjugated diene double bonds have been reduced;
  c. each A block having a number average molecular weight between about 3,000 and about 60,000 and each B block having a number average molecular weight between about 30,000 and about 300,000;
  d. each B block comprises terminal regions adjacent to the A blocks that are rich in conjugated diene units and one or more regions not adjacent to the A blocks that are rich in mono alkenyl arene units;
  e. the total amount of mono alkenyl arene in the hydrogenated block copolymer is about 5 percent weight to about 80 percent weight; and
  f. the weight percent of mono alkenyl arene in each B block is between about 10 percent and about 75 percent; and
(b) about 50 to about 95 percent by weight of a thermoplastic polyurethane elastomer.

The mono alkenyl arene is preferably styrene, alpha-methyl styrene and mixtures thereof, more preferably styrene.

For purposes hereof, "controlled distribution" is defined as a molecular structure having the following attributes: (1) terminal regions adjacent to the mono alkenyl arene homopolymer ("A 2") blocks that are rich in conjugated diene units; (2) one or more regions not adjacent to the A 2 blocks that are rich in mono alkenyl arene units; and (3) an overall structure having relatively low mono alkenyl arene, e.g., styrene, blockiness. For the purposes hereof, "rich in" is defined as having greater than the average amount, preferably 5% greater than the average amount. This relatively low mono alkenyl arene blockiness can be shown by either the presence of only a single glass transition temperature (Tg) intermediate between the Tg's of either monomer alone, when analyzed using differential scanning calorimetry ("DSC") thermal methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the B 2 block. A sharp and substantial increase in this value is indicative of a substantial increase in polystyryllithium chain ends. In such a process, this will only occur if the conjugated diene concentration drops below the critical level to maintain controlled distribution polymerization. Any mono alkylene arene monomer, such as, for example, styrene, that is present at this point will add in a blocky fashion. The term "styrene blockiness", as measured by those skilled in the art using proton NMR, is defined to be the proportion of S (i.e., styrene) units in the polymer having two S nearest neighbors on the polymer chain. Although this discussion relates to styrene blockiness, it is appreciated by those skilled in the art that the same holds for any mono alkenyl arene monomer.

The styrene blockiness is determined after using H-1 NMR to measure two experimental quantities as follows: First, the total number of styrene units (i.e., arbitrary instrument units which, when a ratio is taken, cancel out) is determined by integrating the total styrene aromatic signal in the H-1 NMR spectrum from 7.5 to 6.2 ppm and dividing this quantity by 5 to account for the 5 aromatic hydrogens on each styrene aromatic ring. Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, High Resolution NMR of Macromolecules (Academic Press, New York and London, 1972), Chapter 6.

The styrene blockiness is simply the percentage of blocky styrene to total styrene units:

Blocky %=100 times (Blocky Styrene Units/Total Styrene Units)

Expressed thus, Polymer-Bd-S—(S) n-S-Bd-Polymer, where n is greater than zero is defined to be blocky styrene. For example, if n equals 8 in the example above, then the blockiness index would be 80%. It is preferred in the present invention that the blockiness index be less than about 40. For some polymers, having styrene contents of ten weight percent to forty weight percent, it is preferred that the blockiness index be less than about 10. It should be noted that although the blockiness is described in terms of styrene, the above description holds for other mono alkenyl arenes.

Each A block preferably has a peak number average molecular weight between about 3,000 and about 60,000, more preferably between about 5,000 and 45,000, and each B block preferably has a peak number average molecular weight (MW) between about 30,000 and about 300,000 if it is a linear block copolymer and half that amount if it is a radial block copolymer.

The total amount of mono alkenyl arene in the non-hydrogenated block copolymer is preferably about 7 percent weight to about 40 percent weight, and more preferably about 10 to about 30 percent weight, including all points in-between.

The polyurethane component has no limitation in respect of its formulation other than the requirement that it be thermoplastic in nature which means it is prepared from substantially difunctional ingredients, i.e. organic diisocyanates and components being substantially difunctional in active hydrogen containing groups. However, oftentimes minor proportions of ingredients with functionalities higher than two may be employed. This is particularly true when using extenders such as glycerin, trimethylolpropane, and the like. Such thermoplastic polyurethane compositions are generally referred to as TPU materials. Accordingly, any of the TPU materials known in the art can be employed in the present blends. For representative teaching on the preparation of TPU materials see Polyurethanes: Chemistry and Technology, Part II, Saunders and Frisch, 1964 pp 767 to 769, Interscience Publishers, New York, N.Y. and Polyurethane Handbook, Edited by G. Oertel 1985, pp 405 to 417, Hanser Publications, distributed in U.S.A. by Macmillan Publishing Co., Inc., New York, N.Y. For particular teaching on various TPU materials and their preparation see U.S. Pat. Nos. 2,929,800; 2,948,691; 3,493,634; 3,620,905; 3,642,964; 3,963,679; 4,131,604; 4,169,196; Re 31,671; 4,245,081; 4,371,684; 4,379,904; 4,447,590; 4,523,005; 4,621,113; and 4,631,329 whose disclosures are hereby incorporated herein by reference.

As used herein Kraton® A1535 refers to a selectively hydrogenated styrene-(butadiene/styrene)-styrene polymer having the general formula (S-EB/S-S). A1535 has 59% polystyrene content, shore hardness A of 83, no maleic anhydride grafting percent, and is used in powder form. Kraton® RP6670 is a maleated A1536 polymer containing 1.2% bound maleic anhydride. RP6670 has 41% polystyrene content, shore hardness A of 65, maleic anhydride grafting of 1.7%, and is used in pellet form. Kraton® A1536 is a coupled, selectively hydrogenated $(S-B/S)_nX$ polymer having the general formula $(S-EB/S)_nX$ with a high coupling efficiency. A1536 has 41% polystyrene content, shore hardness A of 65, no maleic anhydride grafting percent, and is used in powder form.

The preferred conventional block copolymer employed in the present invention is a selectively hydrogenated block copolymer of the formula S-EB-S or (S-EB/S)nX wherein S is styrene and EB stands for hydrogenated butadiene, e.g., ethylene-butylene. In the preferred S-EB-S or (S-EB/S)nX block copolymer, the styrene end segments preferably have a number average molecular weight from about 3,000 to about 60,000, while the EB mid block typically has a number average molecular weight from about 30,000 to about 300,000. Moreover, when an S-EB-S and (S-EB/S)nX block copolymer is employed, the styrene blocks preferably comprise from about 5 to about 50 weight % of the block copolymer, and the EB mid block comprises from about 10 to about 95 weight % of the selectively hydrogenated block copolymer. The S-EB-S and (S-EB/S)nX block copolymer preferably includes a 1,2 butadiene content that is on the order of about 30% or greater. The preferred TPU is a polymer prepared from a mixture comprising an organic diisocyanate, at least one polymeric diol and at least one difunctional extender. The TPU may be prepared by the prepolymer, quasi-prepolymer, or one-shot methods in accordance with the methods described in the incorporated references above.

Any of the organic diisocyanates previously employed in TPU preparation can be employed including aromatic, aliphatic, and cycloaliphatic diisocyanates, and mixtures thereof Illustrative isocyanates but non-limiting thereof are methylenebis(phenyl isocyanate) including the 4,4'-isomer, the 2,4'-isomer and mixtures thereof, m- and p-phenylene diisocyanates, chlorophenylene diisocyanates, alpha,alpha-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate and the like; cycloaliphatic diisocyanates such as methylenebis(cyclohexyl isocyanate) including the 4,4'-isomer, the 2,4'-isomer and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, and all geometric isomers and mixtures thereof and the like. Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164; 3,644,457; 3,883,571; 4,031,026; 4,115,429; 4,118,411; and 4,299,347. The modified methylenebis(phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired.

Preferred classes of organic diisocyanates include the aromatic and cycloaliphatic diisocyanates. Preferred species within these classes are methylenebis(phenyl isocyanate) including the 4,4'-isomer, the 2,4'-isomer, and mixtures thereof, and methylenebis(cyclohexyl isocyanate) inclusive of the isomers described above.

The polymeric diols which can be used are those conventionally employed in the art for the preparation of TPU elastomers. The polymeric diols are responsible for the formation of soft segments in the resulting polymer and advantageously have molecular weights (number average) falling in the range of 400 to 4,000, and, preferably 500 to 3,000. It is not unusual, and, in some cases, it can be advantageous to employ more than one polymeric diol. Exemplary of the diols are polyether diols, polyester diols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with amine-terminated polyethers and amino-terminated polybutadiene-acrylonitrile copolymers.

Illustrative of polyether polyols are polyoxyethylene glycols, polyoxypropylene glycols which, optionally, have been capped with ethylene oxide residues, random and block copolymers of ethylene oxide and propylene oxide; polytetramethylene glycol, random and block copolymers of tetrahydrofuran and ethylene oxide and or propylene oxide, and products derived from any of the above reaction with di-functional carboxylic acids or esters derived from said acids in which latter case ester interchange occurs and the esterifying radicals are replaced by polyether glycol radicals. The preferred polyether polyols are random and block copolymers of ethylene and propylene oxide of functionality approximately 2.0 and polytetramethylene glycol polymers of functionality about 2.0.

Illustrative of polyester polyols are those prepared by polymerizing ϵ-caprolactone using an initiator such as ethylene glycol, ethanolamine and the like, and those prepared by esterification of polycarboxylic acids such as phthalic, terephthalic, succinic, glutaric, adipic azelaic and the like acids with polyhydric alcohols such as ethylene glycol, butanediol, cyclohexanedimethanol and the like.

Illustrative of the amine-terminated polyethers are the aliphatic primary di-amines structurally derived from polyoxypropylene glycols. Polyether diamines of this type are available from Jefferson Chemical Company under the trademark JEFFAMINE.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595, or U.S. Pat. No. 4,631,329 cited supra and already incorporated herein.

Illustrative of the hydroxy-terminated polybutadiene copolymers are the compounds available under the trade name Poly BD Liquid Resins from Arco Chemical Company. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively.

Preferred diols are the polyether and polyester diols set forth above.

The difunctional extender employed can be any of those known in the TPU art disclosed above. Typically the extenders can be aliphatic straight and branched chain diols having from 2 to 10 carbon atoms, inclusive, in the chain. Illustrative of such diols are ethylene glycol, 1,3-propanediol, 1,4-butanediol, 1,5-pentanediol, 1,6-hexanediol, neopentyl glycol, and the like; 1,4-cyclohexanedimethanol; hydroquinonebis-(hydroxyethyl)ether; cyclohexylenediols (1,4-, 1,3-, and 1,2-isomers), isopropylidenebis(cyclohexanols); diethylene glycol, dipropylene glycol, ethanolamine, N-methyl-diethanolamine, and the like; and mixtures of any of the above. As noted previously, in some cases minor proportions (less than about 20 equivalent percent) of the difunctional extender may be replaced by trifunctional extenders without detracting from the thermoplasticity of the resulting TPU; illustrative of such extenders are glycerol, trimethylolpropane and the like.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol and 1,4-cyclohexanedimethanol.

The equivalent proportions of polymeric diol to said extender can vary considerably depending on the desired hardness for the TPU product. Generally speaking, the proportions fall within the respective range of from about 1:1 to about 1:20, preferably from about 1:2 to about 1:10. At the same time the overall ratio of isocyanate equivalents to equivalents of active hydrogen containing materials is within the range of 0.90:1 to 1.10:1, and preferably, 0.95:1 to 1.05:1.

The TPU forming ingredients can be reacted in organic solvents but are preferably reacted in the absence of solvent by melt-extrusion at a temperature of from about 125° C. to about 250° C., preferably from about 160° C. to about 225° C.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228-232; see also, Britain et al., J. Applied Polymer Science, 4, 207-211, 1960. Such catalysts include organic and inorganic acids salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin dioctoate, dibutyltin dilaurate, and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N', N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

If desired, the polyurethanes can have incorporated in them, at any appropriate stage of preparation, additives such as pigments, fillers, lubricants, stabilizers, antioxidants, coloring agents, fire retardants, and the like, which are commonly used in conjunction with polyurethane elastomers.

Anionic, solution co-polymerization to form the non-hydrogenated copolymers of the present invention can be carried out using known and previously employed methods and materials. In general, the polymerization is attained anionically, using known selections of adjunct materials, including polymerization initiators, solvents, promoters, and structure modifiers.

An aspect of the present invention is to control the microstructure or vinyl content of the conjugated diene in the selectively hydrogenated copolymer block B and in the softening modifier. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 5 to about 20 mol percent of the condensed butadiene units in the copolymer block have 1,2 vinyl configuration as determined by proton NMR analysis.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the novel selectively hydrogenated copolymers and softening modifiers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers.

The B block may be composed of conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene". Alternatively, the B block is composed of isoprene or ethylene/butylene.

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 30° C. to about 90° C. It is carried out in an inert atmosphere preferably nitrogen, and may also be accomplished under pressure within the range of from about 0.5 to about 10 bars. This polymerization generally requires less than about 12 hours, and can be accomplished in from about 5 minutes to about 5 hours, depending upon the temperature, the concentration of the monomer components, the molecular weight of the polymer and the amount of distribution agent that is employed.

As used herein, "thermoplastic block copolymer" is defined as a block copolymer having at least a first block of one or more mono alkenyl arenes, such as styrene and a second block of one or more dienes. The method to prepare this thermoplastic block copolymer is via any of the methods generally known for block polymerizations. The present invention includes as an embodiment a thermoplastic copolymer composition, which may be a di-block, tri-block copolymer, tetra-block copolymer or multi-block composition. In the case of the di-block copolymer composition, one block is the alkenyl arene-based homopolymer block and polymerized therewith is a second block of a polymer of diene. In the case of the tri-block composition, it comprises, as end-blocks the glassy alkenyl arene-based homopolymer and as a mid-block the diene. Where a tri-block copolymer composition is prepared, the diene polymer can be herein designated as "B"

and the alkenyl arene-based homopolymer designated as "A". The A-B-A, tri-block compositions can be made by either sequential polymerization or coupling. In addition to the linear, A-B-A configuration, the blocks can be structured to form a radial (branched) polymer, (A-B)nX, or both types of structures can be combined in a mixture. Some A-B diblock polymer can be present but preferably at least about 90 weight percent of the block copolymer is A-B-A or radial (or otherwise branched so as to have 2 or more terminal resinous blocks per molecule) so as to impart strength.

Preparation of radial (branched) polymers requires a post-polymerization step called "coupling". It is possible to have either a branched selectively hydrogenated block copolymer and/or a branched tailored softening modifier. In the above radial formula for the selectively hydrogenated block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetraethoxysilane (TEOS), aliphatic diesters such as dimethyl adipate and diethyl adipate, and diglycidyl aromatic epoxy compounds such as diglycidyl ethers deriving from the reaction of bis-phenol A and epichlorohydrin.

Additional possible post-polymerization treatments that can be used to further modify the configuration of the polymers includes chain-termination. Chain termination simply prevents further polymerization and thus prevents molecular weight growth beyond a desired point. This is accomplished via the deactivation of active metal atoms, particularly active alkali metal atoms, and more preferably the active lithium atoms remaining when all of the monomer has been polymerized. Effective chain termination agents include water; alcohols such as methanol, ethanol, isopropanol, 2-ethylhexanol, mixtures thereof and the like; and carboxylic acids such as formic acid, acetic acid, maleic acid, mixtures thereof and the like. See, for example, U.S. Pat. No. 4,788,361, the disclosure of which is incorporated herein by reference. Other compounds are known in the prior art to deactivate the active or living metal atom sites, and any of these known compounds may also be used.

It is also important to control the molecular weight of the various blocks. As used herein, the term "molecular weight" refers to the true molecular weight in g/mol of the polymer of block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

The last step, following all polymerization(s), is a finishing treatment to remove the final polymers from the solvent. Various means and methods are known to those skilled in the art, and include use of steam to evaporate the solvent, and coagulation of the polymer followed by filtration. The final result is a "clean" block copolymer composition useful for a wide variety of challenging applications, according to the properties thereof.

Functionalized polymers may be added to the block copolymer to improve the compatibilization of the block copolymer with the TPU. The functionalized polymers also improve abrasion and strength of the composition. In the examples provided below, RP6670 is utilized as the funtionalized polymer. RP6670 is functionalized Kraton® A, which is commercially available. One of ordinary skill in the art understands how to functionalize a polymer, for example, it is known to functionalize hydrogenated styrene-butadiene-styrene (SBS) block copolymers by first lithiating them by reaction with RLi n in the presence of a promoter such as triethylamine or tetramethylethylenediamine (TMEDA) as described in U.S. Pat. Nos. 4,868,243 and 4,868,245 which are herein incorporated by reference.

High molecular weight polymers, such as Kraton G1651, Kraton 1633, and Kraton A1535 perform better on abrasion resistance, but these materials are ineffective for hardness modification. It has been found that the addition of oil lowers the Shore A hardness and improves abrasion performance. An exemplary oil is a white mineral oil available under the trade designation Drakeol 34 from the Pennzoil Company Pennreco Division. Drakeol 34 has a specific gravity of 0.864-0.878 at 60° F., a flash point of 460° F., and viscosity of 370-420 SUS at 100° F. Suitable vegetable oils and animal oils or their derivatives may also be used as the oil.

EXAMPLES

The Examples described below are processed by extrusion and injection molding. During the extrusion process, the TPU is dried using a vacuum oven at a temperature of about 93° C. to about 104° C. for about 2 to about 4 hours prior to extrusion. Compounds of TPU and the polymers were prepared on a Werner & Pfleiderer 25 mm twin screw extruder. The typical temperature profile of the extruder is listed below:

| Zone 1 | Zone 2 | Zone 3 | Zone 4 | Zone 5 | Zone 6 |
| --- | --- | --- | --- | --- | --- |
| 185° C. | 210° C. | 220° C. | 230° C. | 230° C. | 230° C. |

Slight adjustments, known to one of ordinary skill in the art, of these temperatures is needed, especially in zones 3 to 6, depending upon the compositions of the polymers utilized. During injection molding process, the TPU and polymer are dried in a vacuum oven at about 70° C. for about 2 to about 3 hours prior to injection molding. The conditions and parameters are varied depending on sample compositions, but preferably the barrel temperature is in the range of about 130° C. to about 196° C.

The following tests were used to analyze the results found in tables 1 through 4:

MFR, or melt flow rate is measured on dried compound pellets at 230° C./5 kg.

Hardness is tested according to ASTM D2240.

Tensile properties are measured according to ASTM D-412.

Taber Abrasion is measured by Taber weight loss according to ASTM 3389-94(99), H18 wheels, 1000 g load and 1000 cycles.

Optical Clarity according to ASTM D1003.

Selected Kraton® G, Kraton D®, and Kraton A® polymers were evaluated for the modification of ESTANE® 58300, which is a polyether based TPU for extrusion and injection molding applications and is available from Lubrizol. The formulation consisted of 40% of a Kraton® polymer and 60% TPU. The data is summarized below in Table 1.

TABLE 1

| Sample | E58300 | TS-35 | TS-36 | TS-37 | TS-39 | TS-45 | TS-65 | TS-69 | TS-68 |
|---|---|---|---|---|---|---|---|---|---|
| Kraton polymer | — | MD6945 | G1657 | G1643 | A1536 | D1161 | G1651 | G1633 | A1535 |
| Hardness, A | 76 | 62 | 65 | 68 | 73 | 62 | 75 | 74 | 71 |
| TS, psi MD/TD | 2369/2107 | 1354/1028 | 1254/1352 | 1411/1123 | 750/1059 | 1446/989 | 1229/1335 | 1328/1409 | 2099/2198 |
| Taber loss, mg/1000rev | 18 | 1356 | 1024 | — | 441 | 469 | 43 | 27 | 81 |

Table 1 shows that low styrene content and low molecular weight polymers, G1657, G1643, MD6945, are very effective for hardness reduction. However, the blends prepared with these products have poor abrasion resistance. On the other hand, high molecular polymers, G1651, G1633 and A1535, show much better abrasion than low molecular weight materials. For optical properties, E58300/Kraton® G blends are opaque. Estane 58300/Kraton® A1536, TS-39 show good optical transparency. This is due to less difference of refractive index between E58300 and A1536. In fact, the refractive index of TPU can be matched by blending A1535 and A1536. Sample TS-99, prepared with Kraton® A blend, has excellent clarity.

A SIS polymer, D1161, was evaluated since it has low hardness and good flow properties. It is clear that D1161, in TS-45, is very effective for hardness modification. An addition of 40% D1161 reduces hardness from 76 to 62 Shore A.

Table 2 further compares the optical clarity of a TPU with two TPU/Kraton® Polymer blends. The formulation comprises 40% of a Kraton® product and 60% of a TPU. The Kraton® A blend comprises 50% A1536, 37.5% A1535 and 12.5% RP6670.

TABLE 2

| Sample | E58300 | TS-45 | TS-99 |
|---|---|---|---|
| Kraton Product | — | D1161 | Kraton ® A blend |
| Hardness, Shore A | 76 | 62 | 72 |
| Tensile strength, psi, MD/TD | 2369/2107 | 1573/1613 | 2058/2212 |
| Taber loss, mg | 17.8 | 469 | 83 |
| Transmittance, % | 89 | 89 | 88 |

Table 2 shows that the E58300/D1161 blend has excellent optical clarity. This is due to similar refractive index (RI) between E58300 (RI 1.527) and D1161 (RI 1.529).

Table 3 compares the compatibilization of TPU and Kraton polymers with the addition of functionalized polymers.

TABLE 3

| Composition | TS-39 | TS-55 | TS-45 | TS-56 | TS-57 | TS-36 | TS-06 | TS-35 | TS-07 |
|---|---|---|---|---|---|---|---|---|---|
| E58300 | 60 | 60 | 60 | 60 | 60 | | | | |
| RP6936/RP6670 | 40/0 | 30/10 | | | 35/5 | | | | |
| D1161/RP6670 | | | 40/0 | | | | | | |
| | | | | | 30/10 | | | | |
| MD6945/f-MD6945 | | | | | | 40 | 20/20 | | |
| G1657/FG1901 | | | | | | | | 40 | 20/20 |
| Hardness, Shore A | 73 | 71 | 62 | 72.6 | 63 | 63.5 | 66.8 | 67.1 | 60 |
| Tensile strength, psi MD/TD, | 750/1045 | 2055/2047 | 1446/989 | 1950/2200 | 1775/1669 | 1254/1352 | 1173/1127 | 1354/1028 | 1150/1102 |
| Taber loss, mg/1000rev | 441 | 79 | 469 | 166 | 278 | 1024 | 84 | 1356 | 86 |

The data in Table 3 demonstrates that the addition of functionalized polymers has a significant impact on compound performance. The samples with functionalized polymers have significantly better abrasion resistance and tensile strength as shown in Table 3. Sample TS-39, TS-55, and TS-56 are prepared with Kraton® A1536 (RP6936). The addition of 10% RP6670 (which is functionalized Kraton® A) in TS-55 reduces the Taber loss from 441 mg to 79 mg. This indicates anhydride functionalized products enhance interfacial adhesion, and improves compatibilization of two phases. Different contents, 5%, 10% and 20% were studied in A1536 formulations. The data shows that 5-10% functionalized polymer is enough for good performance, but up to about 20% may be used. The MD6945/f-MD6945 (f-MD6945 is functionalized MD6945) combination is very effective for hardness reduction and demonstrates good performance in terms of abrasion and strength.

Table 4 demonstrates the effect of functionalized polymer contents

TABLE 4

| Composition | TS-60 | TS-73 | TS-72 |
|---|---|---|---|
| E58300 | 60 | 60 | 60 |
| G1651 | 15 | | |

TABLE 4-continued

| Composition | TS-60 | TS-73 | TS-72 |
|---|---|---|---|
| G1633 | | 15 | |
| RP6935 | | | 15 |
| FG1901 | 5 | 5 | |
| RP6670 | | | 5 |
| Drakeol 34 | 20 | 20 | 20 |
| Properties | | | |
| Hardness, Shore A | 57 | 59.7 | 58.7 |
| Tensile strength, psi, MD/TD | 1329/1417 | 1304/1387 | 1496/1808 |
| Taber loss, mg/1000 rev | 13 | 8 | 1.5 |

High molecular weight polymers Kraton® G1651, Kraton® G1633, and Kraton® A1535 perform better on abrasion resistance, but these materials are ineffective for hardness modification. To reduce hardness, a number of high molecular weight polymers with the addition of oil were investigated. These results are summarized in Table 4. These materials have 60 A hardness and excellent abrasion performance. Comparative Example TS-73 is prepared with FG1901 a maleated controlled distribution block copolymer and has a 8 mg Taber loss. Sample TS-72, a material prepared with Kraton® A1535 has shown the best performance with 1.5 mg Taber loss. TS-72 has better strength and wear resistance at equivalent hardness at TS-73.

The polymer compositions of the present invention are useful in a wide variety of applications. The following is a partial list of the many potential end uses or applications: over molding, personal hygiene, molded and extruded goods, barrier films, packaging, closures such as synthetic corks and cap seals, tubing, footwear, containers including containers for food or beverages, interior automotive applications, window gaskets, oil gels, foamed products, fibers including bicomponent and monofilament, adhesives, cosmetics and medical goods.

Finally, the copolymer compositions of the present invention can be compounded with other components not adversely affecting the copolymer properties. Exemplary materials that could be used as additional components would include, without limitation, pigments, antioxidants, stabilizers, surfactants, waxes, flow promoters, traditional processing oils, solvents, particulates, and materials added to enhance processability and pellet handling of the composition. The following examples are intended to be illustrative only, and are not intended to be, nor should they be construed as being, limitative in any way of the scope of the present invention Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

The invention claimed is:

1. A novel block copolymer composition comprising:
   (a) a hydrogenated block copolymer that has at least one block A and at least one block B, and wherein:
      a. prior to hydrogenation each A block is a mono alkenyl arene homopolymer block and each B block is a controlled distribution copolymer block of at least one conjugated diene and at least one mono alkenyl arene;
      b. subsequent to hydrogenation about 0-10% of the arene double bonds have been reduced, and at least about 90% of the conjugated diene double bonds have been reduced;
      c. each A block having a number average molecular weight between about 3,000 and about 60,000 and each B block having a number average molecular weight between about 30,000 and about 300,000;
      d. each B block comprises terminal regions adjacent to the A blocks that are rich in conjugated diene units and one or more regions not adjacent to the A blocks that are rich in mono alkenyl arene units;
      e. the total amount of mono alkenyl arene in the hydrogenated block copolymer is about 5 percent weight to about 50 percent weight; and
      f. the weight percent of mono alkenyl arene in each B block is between about 10 percent and about 75 percent; and
   (b) about 50 to about 95 percent by weight of a thermoplastic polyurethane elastomer based on the weight of the novel block copolymer composition.

2. The composition according to claim 1, further comprising between about 0.1 wt % to about 5 wt % of a maleated controlled distribution block copolymer based on the weight of the novel block copolymer composition.

3. The composition according to claim 1, wherein the mono alkenyl arene is styrene.

4. The composition according to claim 1, wherein the the conjugated diene is selected from the group consisting of butadiene and isoprene.

5. The composition according to claim 1, further comprising oil in an amount between about 10 wt % to about 20 wt % based on the weight of the novel block copolymer composition.

6. The composition according to claim 1, wherein the conjugated diene block comprises from about 1 wt % to about 20 wt % of a functionalized block copolymer.

7. The composition according to claim 1 wherein said A block in the novel block copolymer composition contains about 10 to about 30 percent by weight styrene.

8. The composition according to claim 1, wherein said thermoplastic polyurethane is derived from the reaction of an organic diisocyanate, at least one polymeric diol, and at least one difunctional extender.

9. A novel block copolymer composition comprising:
   (a) a hydrogenated block copolymer that has at least one block A and at least one block B, and wherein:
      a. prior to hydrogenation each A block is a mono alkenyl arene homopolymer block and each B block is a controlled distribution copolymer block of at least one conjugated diene and at least one mono alkenyl arene;
      b. subsequent to hydrogenation about 0-10% of the arene double bonds have been reduced, and at least about 90% of the conjugated diene double bonds have been reduced;
      c. each A block having a number average molecular weight between about 3,000 and about 60,000 and each B block having a number average molecular weight between about 30,000 and about 300,000;
      d. each B block comprises terminal regions adjacent to the A blocks that are rich in conjugated diene units and one or more regions not adjacent to the A blocks that are rich in mono alkenyl arene units;
      e. the total amount of mono alkenyl arene in the hydrogenated block copolymer is about 5 percent weight to about 50 percent weight; and
      f. the weight percent of mono alkenyl arene in each B block is between about 10 percent and about 75 percent; and (b) about 50 to about 95 percent by weight of a thermoplastic polyurethane elastomer based on the weight of the novel block copolymer composition.

10. The composition according to claim 9, further comprising between about 0.1 wt % to about 5 wt % of a maleated controlled distribution block copolymer based on the weight of the novel block copolymer composition.

11. The composition according to claim 9, wherein each B block contains between about 5 wt % to about 10 wt % of a functionalized polymer.

12. The composition according to claim 9, wherein the thermoplastic polyurethane is derived from 4,4'-methylenebis(cyclohexyl isocyanate), a 2,000 molecular weight polyethyleneoxy capped polypropyleneoxy diol, and 1,4-butanediol.

13. The composition according to claim 9, wherein thermoplastic polyurethane is derived from 4,4'-methylenebis (phenyl isocyanate), a blend of a 2,000 and 700 molecular weight polybutylene adipate diol, and 1,4-butanediol.

14. The composition according to claim 9, wherein said thermoplastic polyurethane is a polyether based polyurethane.

15. The composition according to claim 9, wherein the amount of polyurethane is about 50 to about 80 percent by weight.

16. A novel block copolymer composition comprising:
(a) a. a hydrogenated block copolymer that has at least one block A and at least one block B, and wherein:
b. prior to hydrogenation each A block is a mono alkenyl arene homopolymer block and each B block is a controlled distribution copolymer block of at least one conjugated diene and at least one mono alkenyl arene;
c. subsequent to hydrogenation about 0-10% of the arene double bonds have been reduced, and at least about 90% of the conjugated diene double bonds have been reduced;
d. each A block having a number average molecular weight between about 3,000 and about 60,000 and each B block having a number average molecular weight between about 30,000 and about 300,000;
e. each B block comprises terminal regions adjacent to the A blocks that are rich in conjugated diene units and one or more regions not adjacent to the A blocks that are rich in mono alkenyl arene units;
f. the total amount of mono alkenyl arene in the hydrogenated block copolymer is about 5 percent weight to about 50 percent weight;
g. the weight percent of mono alkenyl arene in each B block is between about 10 percent and about 75 percent;
h. from about 10 wt % to about 20 wt % of oil based on the weight of the novel block copolymer composition; and
(b) about 50 to about 95 percent by weight of a thermoplastic polyurethane elastomer based on the weight of the novel block copolymer composition.

17. The composition according to claim 16, further comprising between about 0.1 wt % to about 5 wt % of a maleated controlled distribution block copolymer based on the weight of the novel block copolymer composition.

18. The composition according to claim 16, wherein the Shore A hardness is between about 70 to about 60 according to ASTM D2240.

19. The composition according to claim 16, wherein the light transmittance is between about 80 % to about 90 %.

20. The composition according to claim 16, wherein the block copolymer and TPU have a similar refractive index.

\* \* \* \* \*